June 21, 1949.                M. I. LEVY                 2,474,151
                            BEARING BRACKET
                          Filed Jan. 20, 1945

INVENTOR.
MARION I. LEVY
BY
Morton S. Brockman

Patented June 21, 1949

2,474,151

UNITED STATES PATENT OFFICE 2,474,151

BEARING BRACKET

Marion I. Levy, Cleveland, Ohio

Application January 20, 1945, Serial No. 573,791

5 Claims. (Cl. 308—26)

This invention relates to bearing brackets and particularly to the type adaptable for mounting the rotatable shafts of air impellers on blower housings.

The primary object of this invention is to provide a combination socket and support therefor which is able to neatly receive and contain the bearing elements and capable of being quickly and easily assembled and attached to a supporting base.

Another object is to construct a combination device of the type mentioned that may be quickly and easily stamped out of sheet material and which may then be economically rolled and formed into light weight but sturdy streamlined supports.

These and other objects of the invention will become apparent from a reading of the following description and claims, together with the accompanying drawing, in which like parts are referred to and indicated by like reference characters and wherein:

Figure 1:
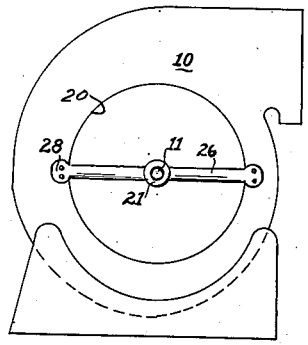
Figure 1 is a view of a bearing bracket mounted on the side of a centrifugal blower.

In the Figure 1 there is shown a bearing bracket made in accordance with this invention. It has broadly an annular socket 21, laterally extending arms 26 and flared ends or ears 28 mounted on the housing 10.

Conducive to a clearer understanding of the invention, it may be well to first describe the bearing elements for which this bracket is designed. However, it should be understood that no invention is claimed in the bearing elements per se.

The rotatable shaft 11 has a short collar or porous metal bushing 12 loosely fitted around the end thereof which is to be supported. This bushing may be made of various metals capable of being permeated with a lubricant. Such bearings are commercially available and are well known in the art.

The lubricant holder is a cast iron ring 13 which has an annular hollowed portion or chamber 14 around the bushing 12. A short tube or neck 15 projects outwardly from the ring 13 and has a longitudinal passage 16 through which a lubricant may be fed into the hollow chamber 14. This may be closed by any suitable means to prevent leakage. The ring 13 is tightly fitted around the bushing 12 intermediate the ends of the latter member.

Figure 5:
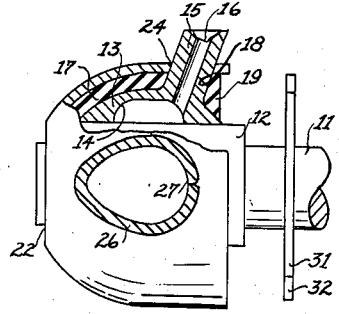
Figure 5 is an enlarged view of the device taken substantially along the line and in the direction of the arrows 5—5 of the Figure 2, showing the shaft and bearing elements therein and particularly showing the lubricating members and means.
Figure 6:
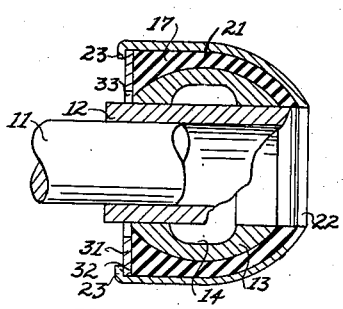
Figure 6 is an enlarged vertical cross sectional view of the bearing socket assembled and showing the shaft and bearing elements contained therein.
Figure 7:
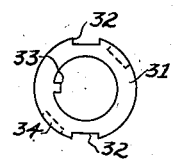
Figure 7 is a plan view of a removable ring used to close the socket and which retains the bearing elements.
Figure 8:
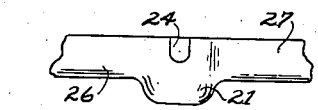
Figure 8 is a side view of the socket, particularly showing the notch therein which receives the projecting lubricating means.

The circular rubber container 17 completely surrounds the iron ring 13 as is clearly shown in the Figures 5 and 6. However, it does have an opening 18 therein for the passage of the lubricating tube 15. The inner edges of the rubber container 17 fit closely around the bushing 12 and it thus absorbs practically all vibration of the shaft 11, the bushing 12, and the lubricating ring 13 and prevents the shock, vibration or noise from being transmitted through the hereinafter described bracket to the housing 10.

The bracket member which consists of the annular socket 21 and the arms 26 is made of sheet metal. The blank form from which it is made is stamped, rolled and bent to the shape shown.

The socket 21 is somewhat cup-shaped and has an opening 22 in the cup bottom through which the free end of the shaft 11 may project. This opening 22 is slightly larger than the diameter of the shaft 11 to permit free and unhindered rotation.

The edge or brim of the cup-like socket 21 has inwardly bent tabs 23 which receive the hereinafter described notched ring 31. A small opening or notch 24 is cut or stamped in one side of the socket 21 to accommodate the lubricating tube 15. This small opening is formed at the brim of the socket and is open at the edge to permit the easy insertion of the tube 15.

The arm portions 26 are formed and rolled so that their longitudinal edges 27 abut each other and thus form tubular elements which are streamlined or aerodynamic in cross section, as is clearly indicated in the Figure 5 of the drawing. The arm portions 26 extend, when mounted, across the mouth or air intake opening 20 of the blower 10, as is clearly shown in the Figure 1. The streamlined arms provide a smoother flow of air into the blower. An unbroken stream of air which is free from annoying turbulence is thus secured. Vibration and noise are reduced to a minimum.

Figure 2:
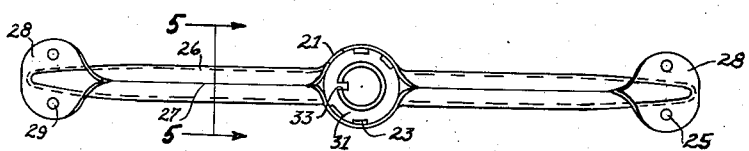
Figure 2 is an elevation of the inside of the bearing bracket.
Figure 3:
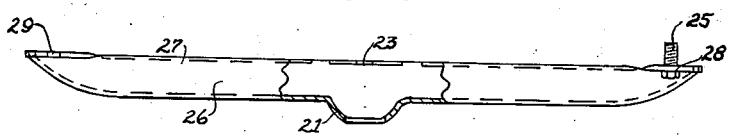
Figure 3 is a side view of the same, with parts of the socket portion broken away.
Figure 4:
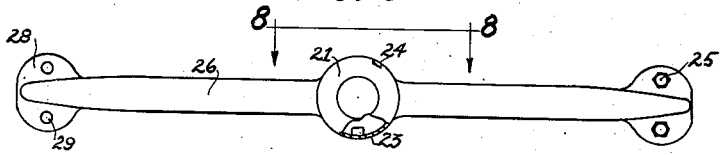
Figure 4 is an elevation of the outside of the bracket and socket.

The inner ends of the arms 26 flare and expand to partially form the heretofore described socket 21 and open therein, as is clearly shown in the Figures 2 and 3. The outer ends of the arms 26 are opened and flared and also drilled or punched to form neat and convenient means for attachment to the base 10. The Figures 2, 3 and 4 clearly show how the ends of the arms are formed for easy mounting of the bracket. In the drawing, Figure 3, the reference character 25 indicates a conventional screw which may be used for mounting the bracket.

The sealing ring 31 is also stamped out of sheet metal. Its outside diameter is slightly smaller than the inside diameter of the socket member 21. Its inside diameter is a little larger than the outside diameter of the bushing 12.

It has notches 32 around its peripheral edge through which the tabs 23 on the socket may freely pass. It also has a small inwardly extending tab 33 which may be used as a convenient grip for either assembly or disassembly of the bearing elements and bracket. This tab 33 is short enough so that it does not touch or bind with the bushing 12.

During assembly and after the bearing elements 12, 13 and 17 are assembled and mounted on the shaft 11, the socket 21 is slipped over the resilient member 17 and so that the lubricating neck 15 passes through the notch 24. The ring 31 is then passed over the bushing 12 and inserted into the socket against the flat face of the rubber container 17 and turned slightly by means of the tab 33. The tabs 23 then engage unnotched portions of the edge of the ring 31 and the tension and resiliency of the rubber container 17 firmly hold the ring 31 in place. If desired, the unnotched portions of the edge of the ring 31 may be recessed or formed with shallow depressions to more firmly engage the tabs 23 and thus prevent accidental unlocking of the elements.

Having thus disclosed the invention in its preferred form, it should be understood that the description and illustration herein should not be considered in a limited sense as there may be other forms or modifications of the device which might also be reasonably held to come within the scope of the appended claims.

I claim:

1. A bearing bracket, comprising in combination, a socket member capable of receiving shaft bearing means and having tubular arm portions integral therewith and opening thereinto, and a separable ring member mounted on the socket member capable of retaining the shaft bearing means therein.

2. A bearing bracket, comprising in combination, a socket member capable of receiving shaft bearing means, the said socket member having inwardly extending tabs on the brim thereof and also having laterally extending tubular arm portions, the said arm portions having flared ends and attachment means thereon for mounting on a base, and a separable ring member mounted on the aforesaid tabs and being capable of retaining the aforesaid shaft bearing means in the socket member.

3. A bearing bracket of the type defined in claim No. 2 and further characterized by the said socket member having an opening therein for the extension therethrough of a lubricating element for the bearing means.

4. In combination with a bearing for a rotatable shaft of the type having a lubricant permeable sleeve, a lubricant chamber around the sleeve and a resilient element surrounding the chamber; a bracket, comprising an annular socket member having tubular arms integral therewith, the said socket member containing the aforesaid sleeve, chamber and resilient element and having spaced tabs on the brim thereof, the said arms opening into the socket member and having flared ends and attachment means thereon for mounting the same on a base, and a ring member mounted in the said socket member and engaged by the said spaced tabs and being capable of retaining the aforesaid sleeve, chamber and resilient element in the socket member.

5. A bearing bracket of the character described comprising in combination, a socket member made of sheet metal bent into suitable form and having tabs on the brim thereof, a tubular arm member made of sheet metal integral with the socket member and having an aerodynamic form for minimizing air turbulence thereat, and a ring member mounted in the socket member and engaged by the said tabs and being parallel with the longitudinal axis of the arm member.

MARION I. LEVY.

REFERENCES CITED

The following references are of record in the file of this patent:

UNITED STATES PATENTS

| Number | Name | Date |
|---|---|---|
| 262,642 | Collins | Aug. 15, 1882 |
| 1,838,820 | Frank | Dec. 29, 1931 |
| 1,879,450 | Palmer | Sept. 27, 1932 |
| 1,964,770 | Runge | July 3, 1934 |
| 2,044,385 | Geyer | June 16, 1936 |
| 2,116,539 | Payne et al. | May 10, 1938 |
| 2,191,341 | Curley | Feb. 20, 1940 |
| 2,208,975 | Hait | July 23, 1940 |
| 2,258,040 | Young | Oct. 7, 1941 |

FOREIGN PATENTS

| Number | Country | Date |
|---|---|---|
| 16,577 | Great Britain | 1902 |